UNITED STATES PATENT OFFICE.

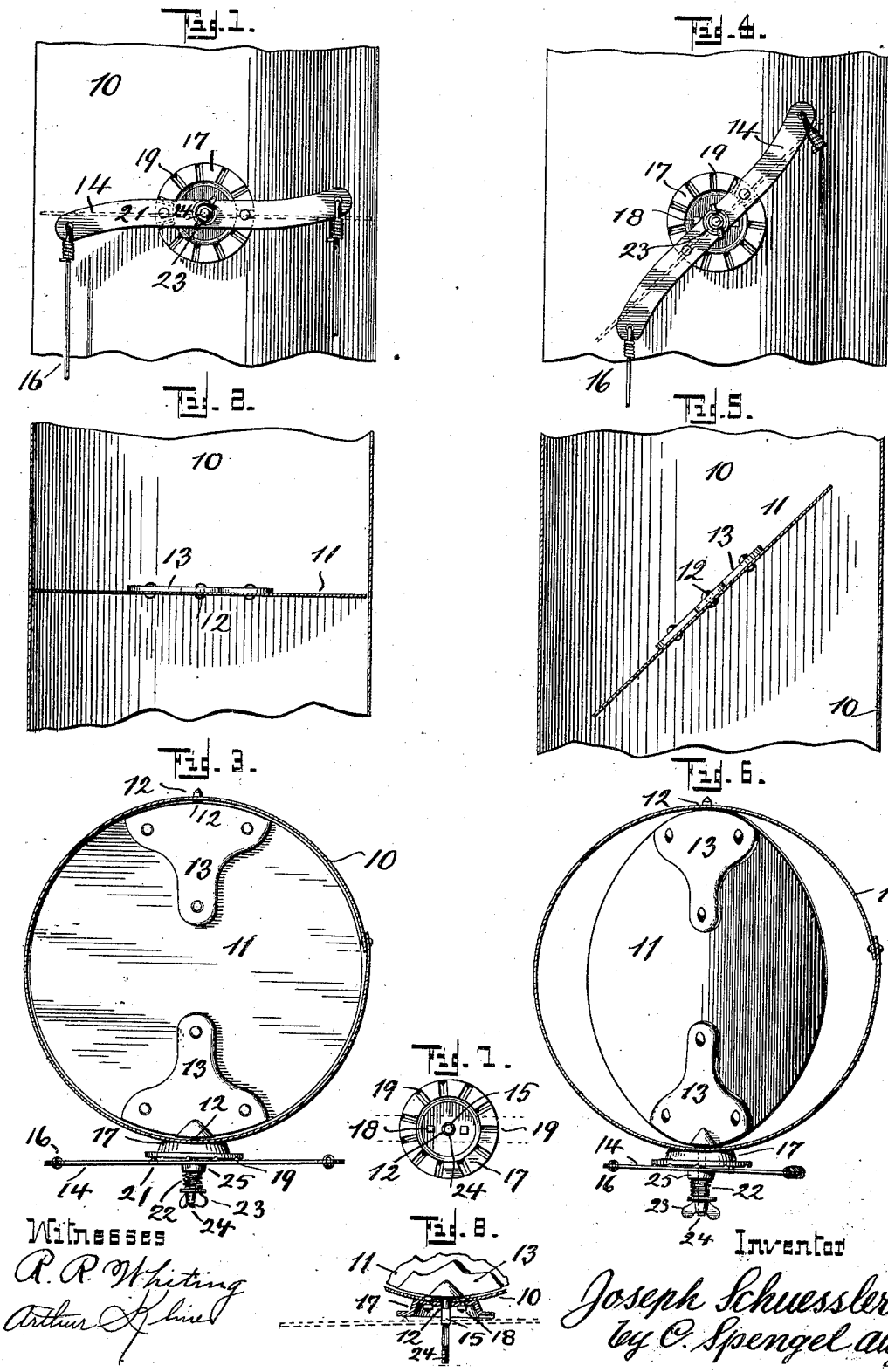

JOSEPH SCHUESSLER, OF CINCINNATI, OHIO.

LOCKING MEANS FOR DAMPERS.

SPECIFICATION forming part of Letters Patent No. 691,009, dated January 14, 1902.

Application filed February 13, 1901. Serial No. 47,105. (No model.)

*To all whom it may concern:*

Be it known that I, JOSEPH SCHUESSLER, a citizen of the United States, residing at Cincinnati, Hamilton county, State of Ohio, have invented certain new and useful Locking Means for Dampers; and I do declare the following to be a clear, full, and exact description of the invention, such as will enable others skilled in the art to which it appertains to make and use the same, attention being called to the accompanying drawings, with the reference-numerals marked thereon, which form also a part of this specification.

This invention relates to improvements in devices used to control and regulate passage through conduits, pipes, flues, &c., and particularly through such conduits as occur in connection with hot-blast-heating systems. Such devices are generally called "dampers" and consist, substantially, of a disk or blade of a size and shape corresponding to the clear inside area of the conduit, it being pivotally supported therein and capable of being tilted, so that, according to the particular position it has been adjusted to, it may either wholly, partly, or not at all prevent passage through the conduit.

The object of my invention is to provide certain means, as hereinafter shown and described and whereby such a damper is positively held in the position to which it has been adjusted.

In the following specification, and particularly pointed out in the claims at the end thereof, is found a full description of the invention, together with its operation, parts, and construction, which latter is also illustrated in the accompanying drawings, in which—

Figure 1 is an elevation, Fig. 2 a vertical central section, and Fig. 3 a top view, of part of a conduit, the part shown being the one which contains the damper, which latter appears in a position in which it closes passage through the conduit. Figs. 4, 5, and 6 in similar views show the damper partly open, merely limiting the passage through the conduit. Figs. 7 and 8 are detail views of the locking-disk, the first showing it in elevation and the other in horizontal section.

10 is the wall of a suitable conduit, of which a part is shown, which part contains also a damper 11, pivotally supported at diametrically opposite points within a conduit. Such conduits are usually cylindrical, with the damper of a shape and size to fit the interior, both being generally of sheet metal. For its pivotal support, as before mentioned, the damper is provided with trunnions 12, diametrically opposite each other, which occupy bearings correspondingly located within the conduit. They form parts of cast-metal flanges 13, whereby they are attached to the damper-blade and pass through and occupy perforations in the wall of the conduit, which in this case form their bearings. This confines the damper-blade longitudinally to its major or supported axis, but leaves it free to turn on such axis, so that by means of a lever 14, mounted upon an extension 15 of one of the trunnions, said damper may be swung to any angle. This extension 15 is preferably square, as shown, and is received by a similar opening in lever 14, so as to hold them immovably to each other for purposes of such rotation. This attachment is, further, such that the lever is in line and parallel with the damper, so that the position of this latter within is always indicated by the position of the lever outside. Where these dampers are in positions not readily accessible, the ends of lever 14 may be provided with wire ropes 16 for manipulation from below.

In order to hold the damper positively in any position to which it has been adjusted, I provide a locking-disk 17, rigidly secured— as by bolts 18, for instance—to the conduit-wall back of lever 14, with the fulcrum of which it is concentric. Its center is perforated to permit passage thereat of the extended trunnion 12. The face of this locking-disk is provided with a number of depressions or notches 19, and the rear side of lever 14 opposite such face has at least one projection 21, located at such distance from the coincident centers of both lever and disk as to travel over these notches. The lever, while rigidly held on the extended trunnion for purposes of rotating the same, is otherwise free to slide thereon with a movement toward the face of locking-disk 27, against which it is yieldingly held by a spring 22, kept in position by a nut 23 at the outer end of a further extension 24 of the trunnion beyond its square part 15, and which additional extension is round and screw-threaded at its outer end. 25 is merely a washer interposed between the inner end of spring 22 and lever 14. It is now understood that as soon as projection 21 arrives opposite one of notches 19 the action of spring 22 will force it into such notch, thus holding lever 14 with the connected damper in that particular position.

Both notches and projection 21 (or at least either one of them) are of such shape as to permit their disengagement in consequence of a decided action on lever 14, so as to permit locking of this latter in any other position. In this case projection 21 is in shape of a flat cone, and notches 19 have sloping sides, so that the former may ride up on these sides and leave the particular notch it occupies, spring 22 yielding sufficiently for such purpose. The action of the spring being constant, however, it will immediately lock lever 14 again as soon as it comes to rest with projection 21 opposite any other one of the notches. The tension of the spring may be regulated by the position of nut 23 on extension 24. The number of available positions to which the damper can be adjusted may be doubled without increasing the number of notches by providing two projections 21 and an uneven number of notches, as shown. The effect of this arrangement is that while one projection is in engagement with a notch the other projection is in the space between two notches diametrically opposite the first notch mentioned, so that the next locking position may be obtained by moving the lever only half the distance between two notches, when the projection, now between two notches, slips into one of them, while the other projection moves out of the notch it occupies. This causes also one part of the lever to be raised off of disk 17, which tilted position, however, only intensifies the engaging action of projection 21 on its other part. The same effect might be obtained in case there is an even number of notches by having projections 21 not in line on lever 14. In this way passage through a conduit may be readily controlled and regulated by the adjustment of the damper to any position by simply manipulating lever 14 accordingly, after which the latter is locked automatically in each case, so as to positively hold the damper in its adjusted position. It will be noted that the complementary parts of the locking mechanism work entirely independent from the damper and without affecting the position of it laterally in any way or pushing the edge of the same or any of its supports against parts of the conduit. This is because the locking-disk has no connection whatsoever with the damper, and the complementary locking-lever bears practically the same relation thereto as far as its function for locking purposes is concerned, since it is free to slide on the extended damper-trunnion to or from the locking-disk without any effect whatsoever on such trunnion, which might have a tendency to change the position of the damper. Projections 21 may be integral parts of lever 14 or suitably attached thereto.

A modification of my invention, in which the place of notches 19 would be taken by a similar number of projections on disk 17, the necessary notches being on the inner side of lever 14, taking the place of projection 21 thereat, would be merely a reversal of some of the features of my invention.

Having described my invention, I claim as new—

1. A damper having diametrically opposite trunnions by which it is to be supported within a conduit, a locking-disk 17 attached to the outside of this latter and having a central perforation through which one of these trunnions extends, a lever mounted on this extension, a spring on the outside of the lever and holding the same yieldingly against the locking-disk, notches arranged around the face of this latter and two projections on the opposite side of the lever and diametrically apart with reference to the locking-disk, the number of these notches being an uneven one, so that while one of them is occupied by one of the projections, the other one of these latter is in the diametrically opposite space between two notches.

2. A damper having diametrically opposite trunnions by which it is to be supported within corresponding bearings within a conduit, the support being such as to confine the damper between its bearings and hold the same immovable except for rotation around its supported axis, one of the trunnions being extended beyond the walls of the conduit, a circular locking-disk 17, having a central perforation to be attached to the outside of the conduit in a position where such perforation receives the extended trunnion, a lever mounted on this latter in a manner to be rigidly connected thereto for rotating it, but free to slide thereon toward or from the face of the locking-disk, which movement is independent from and does not affect the damper or any of its parts, a spring to yieldingly hold the lever against the face of the locking-disk and projections on one and depressions on the other adapted to engage each other to hold the damper in its adjusted position.

In testimony whereof I hereunto set my hand in the presence of two witnesses.

JOSEPH SCHUESSLER.

Witnesses:
C. SPENGEL,
ARTHUR KLINE.